US008861687B2

(12) United States Patent
Li et al.

(10) Patent No.: US 8,861,687 B2
(45) Date of Patent: Oct. 14, 2014

(54) INTEGRATED HYBIRD CIRCUIT APPLIED TO A DIGITAL SUBSCRIBER LOOP AND SETTING METHOD THEREOF

(71) Applicant: Realtek Semiconductor Corp., HsinChu (TW)

(72) Inventors: Cheng-Hsien Li, Hsinchu County (TW); Wen-Chieh Lai, Hsinchu (TW); Chih-Chiang Liao, Hsinchu County (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 0 days.

(21) Appl. No.: 13/937,197

(22) Filed: Jul. 8, 2013

(65) Prior Publication Data

US 2014/0010356 A1    Jan. 9, 2014

(30) Foreign Application Priority Data

Jul. 9, 2012 (TW) .............................. 101124601 A (51) Int. Cl.
| | |
|---|---|
| H04M 1/24 | (2006.01) |
| H04M 3/08 | (2006.01) |
| H04M 3/22 | (2006.01) |
| H04M 9/00 | (2006.01) |
| H04M 1/00 | (2006.01) |

(52) U.S. Cl.
USPC .......... 379/3; 379/1.04; 379/390.04; 379/402

(58) Field of Classification Search
USPC ............ 379/1.01, 1.03, 1.04, 3, 398, 399.01, 379/402, 403, 404, 416.02, 24, 30, 390.04; 375/219, 222, 224, 227, 285
See application file for complete search history.

(56) References Cited

U.S. PATENT DOCUMENTS

| | | | |
|---|---|---|---|
| 7,106,854 B2 * | 9/2006 | Gough et al. ................. 379/398 |
| 7,145,943 B2 * | 12/2006 | Gough et al. ................. 375/222 |
| 7,577,189 B2 * | 8/2009 | Bella et al. .................... 375/222 |
| 2004/0022308 A1 * | 2/2004 | Altekar et al. ................ 375/222 |

* cited by examiner

Primary Examiner — Binh Tieu
(74) Attorney, Agent, or Firm — Winston Hsu; Scott Margo (57) ABSTRACT

An integrated hybrid circuit includes a transmission unit, a transceiver coil, a transceiver circuit, a hybrid matching circuit, and a receiving circuit. The transmission unit generates a pair of upstream signals according to a user transmission signal. The transceiver coil transmits the pair of upstream signals to a central office through a pair of twisted pair, and receiving a pair of downstream signals from the central office through the pair of twisted pair. The hybrid matching circuit receives an adjustment signal to adjust selective impedances. The receiving circuit receives the pair of downstream signals from the central office, and generates the adjustment signal according to downstream and upstream rates and signals from the hybrid matching circuit. The transmission unit adjusts transmission power and bandwidth of the transmission unit and the receiving unit adjusts filter bandwidth of the receiving unit according to the adjustment signal for optimizing upstream and downstream rates.

9 Claims, 5 Drawing Sheets

INTEGRATED HYBIRD CIRCUIT APPLIED TO A DIGITAL SUBSCRIBER LOOP AND SETTING METHOD THEREOF

BACKGROUND OF THE INVENTION

1. Field of the Invention

The present invention relates to an integrated hybrid circuit applied to a digital subscriber loop and a setting method thereof, and particularly to an integrated hybrid circuit applied to a digital subscriber loop and a setting method thereof that not only can increase an upstream rate, but can also efficiently reduce echo noise coupled to a receiving circuit of the integrated hybrid circuit from a transmission unit of the integrated hybrid circuit.

2. Description of the Prior Art

Figure 1:
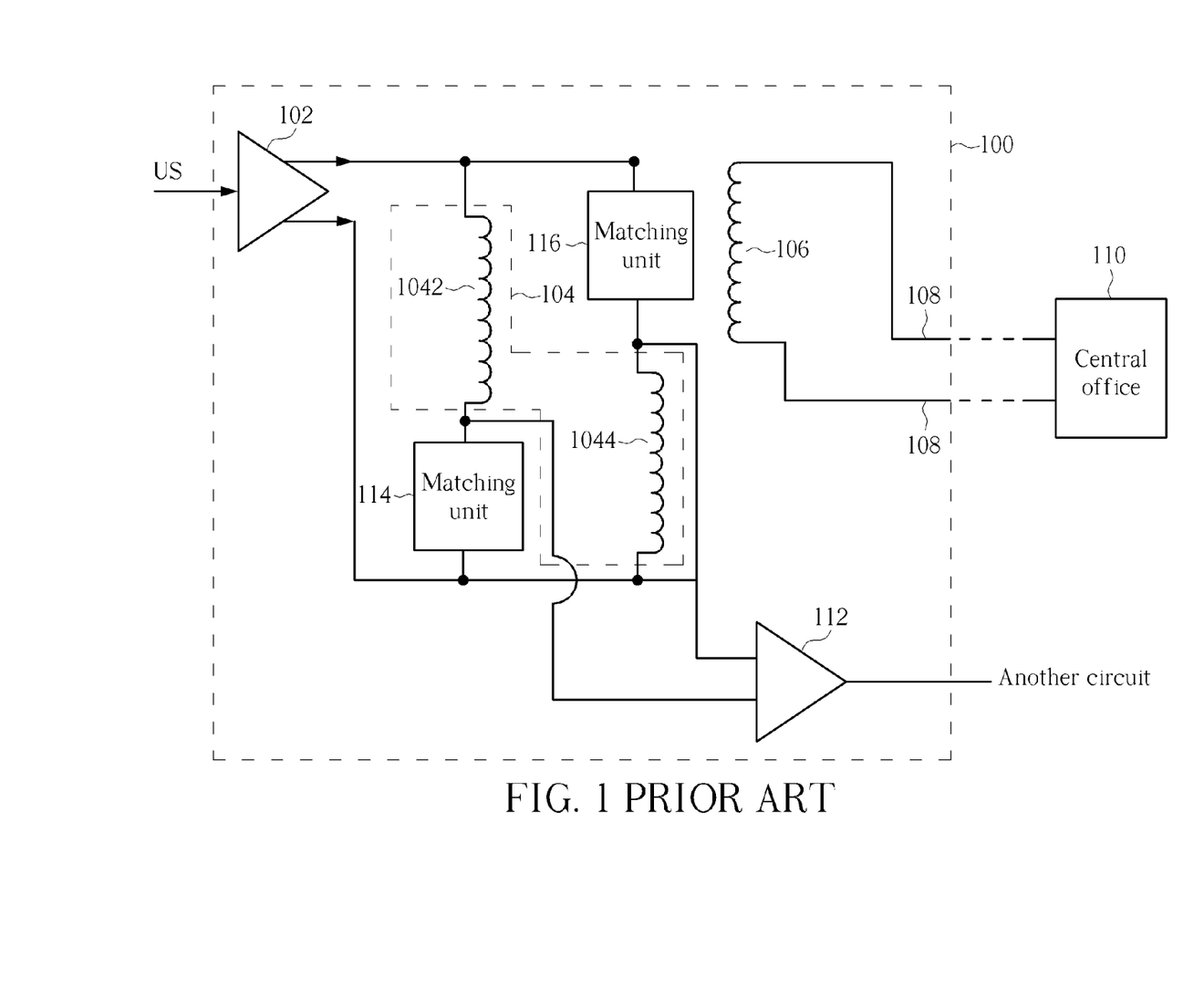
FIG. 1 is a diagram illustrating an hybrid circuit applied to a digital subscriber loop according to the prior art.

Please refer to FIG. 1. FIG. 1 is a diagram illustrating an integrated hybrid circuit 100 applied to a digital subscriber loop according to the prior art. As shown in FIG. 1, after a transmission driver 102 receives a user transmission signal US, the transmission driver 102 can generate a pair of upstream signals. Coils 1042, 1044 of a transceiver circuit 104 receives and couples the pair of upstream signals to a transceiver coil 106. Then, the transceiver coil 106 transmits the pair of upstream signals to a central office 110 through a twisted pair 108. On the other hand, the transceiver coil 106 receives a pair of downstream signals from the central office 110 through the twisted pair 108 and couples the pair of downstream signals to the coils 1042, 1044. Then, the pair of downstream signals is transmitted to a receiving terminal 112 through the coils 1042, 1044. As shown in FIG. 1, the integrated hybrid circuit 100 utilizes a four-to-two transceiver circuit to implement a full-duplex technology to increase efficiency of the hybrid circuit 100. But, a disadvantage of the full-duplex technology is that the receiving terminal 112 of the integrated hybrid circuit 100 may receive coupling noise coupled from the pair of upstream signals, that is, echo noise coupled from the pair of upstream signals. As shown in FIG. 1, matching circuits 114, 116 are used for matching output impedances of the coils 1042, 1044 to decrease echo noise coupled to the receiving terminal 112 from the pair of upstream signals, where the output impedances include impedances of the digital subscriber loop. Although the matching circuits 114, 116 can be designed to have variable impedances, echo cancellation capability of the matching circuits 114, 116 maybe not good because the priori art does not consider transmission power of the transmission driver 102 of the hybrid circuit 100, bandwidth of a filter of the transmission driver 102 of the hybrid circuit 100, bandwidth of a filter of the receiving terminal 112 of the integrated hybrid circuit 100, an upstream rate, and a downstream rate, resulting in the upstream rate and the downstream rate not being optimized.

Figure 2:
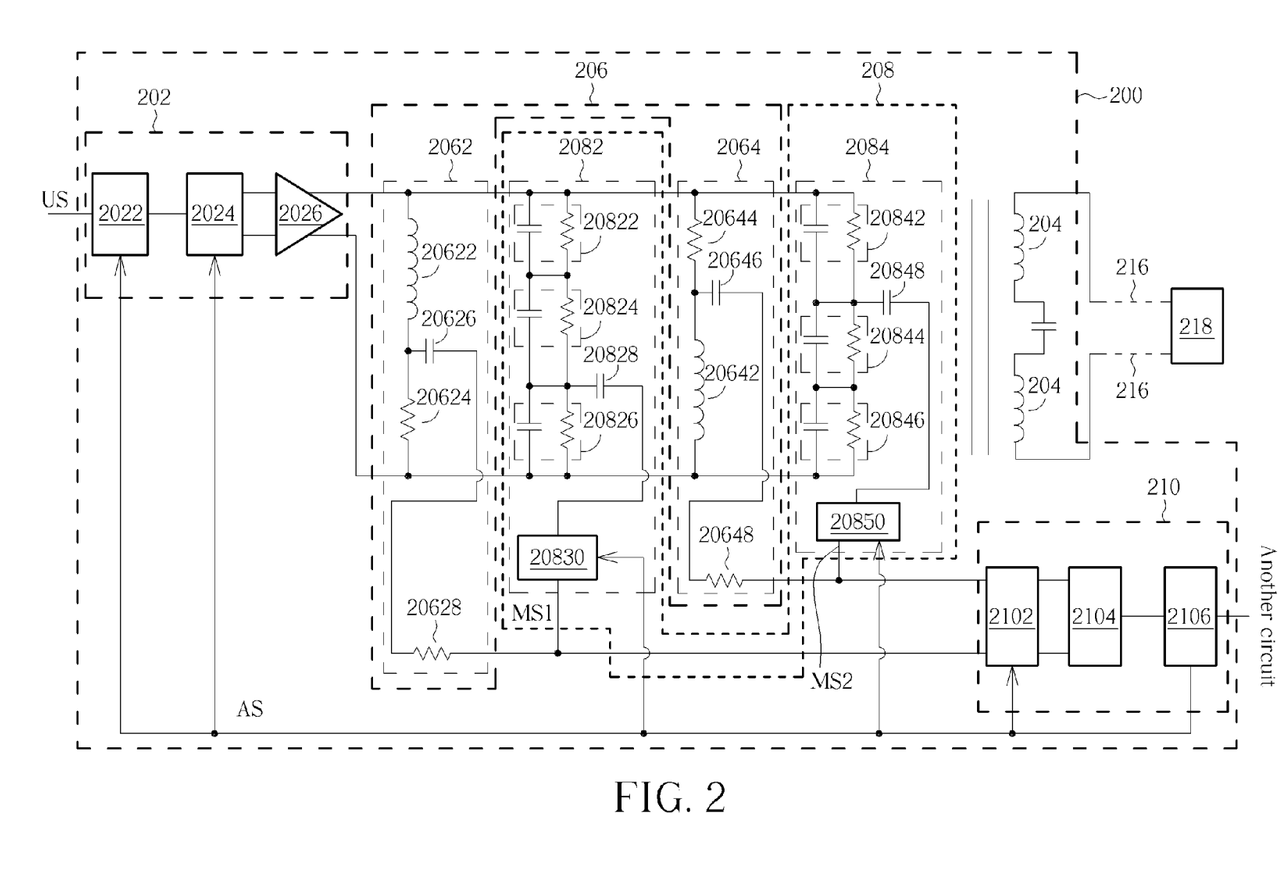
FIG. 2 is a diagram illustrating an integrated hybrid circuit applied to a digital subscriber loop according to an embodiment.
Figure 5:
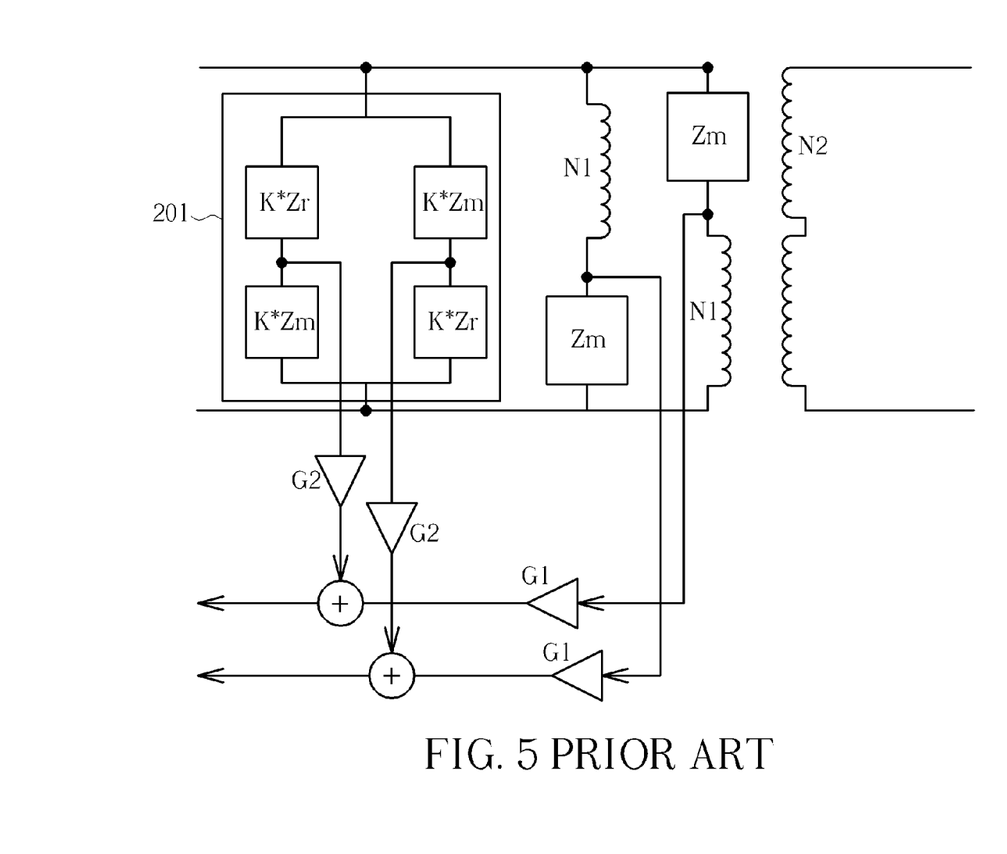
FIG. 5 is a diagram illustrating a hybrid circuit applied to a digital subscriber loop according to another priori art.

FIG. 5 is a diagram illustrating a hybrid circuit applied to a digital subscriber loop according to another priori art (as shown in FIG. 2 of U.S. Pat. No. 6,931,122B2), which adds a matching circuit 201 to increase echo noise suppression capability. However, it still could not tune matching impedance contained in the matching circuit 201 according to subscriber loop length and types, neither to reduce echo noise and increase upstream rate by tuning bandwidth and power of filter at transmission side, and bandwidth of filter at receiving path.

SUMMARY OF THE INVENTION

An embodiment provides an integrated hybrid circuit applied to a digital subscriber loop. The integrated hybrid circuit includes a transmission unit, a transceiver coil, a transceiver circuit, a hybrid matching circuit, and a receiving circuit. The transmission unit is used for generating a pair of upstream signals according to a user transmission signal. The transceiver coil is used for transmitting the pair of upstream signals to a central office through a twisted pair and receiving a pair of downstream signals from the central office through the twisted pair. The transceiver circuit is coupled to the transmission unit for coupling the pair of upstream signals to the transceiver coil or coupling the pair of downstream signals from the transceiver coil, where the transceiver circuit includes two transceiver units. The hybrid matching circuit includes two hybrid matching circuit units, where each hybrid matching circuit contains a selective impedance unit and is used for receiving an adjustment signal to adjust a selective impedance of the hybrid matching circuit unit and generating a matching signal. The receiving circuit is coupled to the hybrid matching circuit and the transceiver circuit for receiving the pair of downstream signals and two matching signals generated by the hybrid matching circuit, and generating the adjustment signal according to an upstream rate, a downstream rate, and echo noise. The transmission unit is further used for adjusting transmission power and bandwidth of the transmission unit according to the adjustment signal, and the receiving circuit is further used for adjusting filter bandwidth of the receiving circuit according to the adjustment signal.

Another embodiment provides a setting method of an integrated hybrid circuit applied to a digital subscriber loop, where the integrated hybrid circuit comprises a transmission unit, a transceiver coil, a transceiver circuit, a hybrid matching circuit, and a receiving circuit. The setting method includes loading default values of the integrated hybrid circuit; the integrated hybrid circuit executing a handshake connection test with a central office according to the default values of the integrated hybrid circuit; detecting if a signal-to-noise ratio (SNR) of the transmission unit and the receiving circuit, and an upstream rate and a downstream rate generated according to the default values of the integrated hybrid circuit meet a requirement of a user during the handshake connection test; and executing a corresponding operation according to a detection result.

The present invention provides an integrated hybrid circuit applied to a digital subscriber loop transceiver system and a setting method thereof. The integrated hybrid circuit can efficiently suppress echo noise coupled to a receiving circuit from a pair of upstream signals transmitted by a transmission unit, and the setting method can utilize a hybrid matching circuit with selective impedances to match a transceiver circuit according to length and types of the digital subscriber loop when the integrated hybrid circuit executes a handshake connection test with a central office. Then, the receiving circuit can generate an adjustment signal according to a signal-to-noise ratio of the receiving circuit, an upstream rate, a downstream rate and echo noise. Then, the integrated hybrid circuit can adjust transmission power and bandwidth of the transmission unit, the selective impedances of the hybrid matching circuit, and filter bandwidth of a receiving filter of the receiving circuit according to the adjustment signal. Therefore, compared to the prior art, the present invention has advantages as follows: first, although the transmission unit has lower transmission power and narrower bandwidth to reduce echo noise coupling to the receiving circuit from the pair of upstream signals, the transmission unit can adjust bandwidth and transmission power of a pre-filter according to the adjustment signal because the transmission unit is integrated with the pre-filter, where because by changing magnitude response of the pre-filter can reduce the transmission power of the transmission unit in a lower frequency, and amplify the transmission power of the transmission unit in a higher frequency, the present invention can compensate insertion loss caused by signal attenuation when the integrated hybrid circuit transmits the pair of upstream signals, resulting in the upstream rate not being decreased; and second, if the echo noise coupled to the receiving circuit from the transmission unit is not low enough, the integrated hybrid circuit can utilize the adjustment signal to adjust the selective impedances of the hybrid matching circuit according to length and types of the digital subscriber loop, and simultaneously adjust the transmission power and bandwidth of the transmission unit and the filter bandwidth of the receiving filter of the receiving circuit according to an upstream rate and downstream rate requirement to make the signal-to-noise ratio of the receiving circuit optimization. Therefore, the present invention not only can increase the upstream rate, but can also efficiently reduce the echo noise coupled to the receiving circuit from the transmission unit, resulting in the downstream and upstream rates being optimized.

These and other objectives of the present invention will no doubt become obvious to those of ordinary skill in the art after reading the following detailed description of the preferred embodiment that is illustrated in the various figures and drawings.

DETAILED DESCRIPTION

Please refer to FIG. 2. FIG. 2 is a diagram illustrating an integrated hybrid circuit 200 applied to a digital subscriber loop according to an embodiment. As shown in FIG. 2, the integrated hybrid circuit 200 includes a transmission unit 202, a transceiver coil 204, a transceiver circuit 206, a hybrid matching circuit 208, and a receiving circuit 210. The transmission unit 202 is used for receiving a user transmission signal US, and generating a pair of upstream signals according to the user transmission signal US. The transceiver coil 204 is used for transmitting the pair of upstream signals to a central office 218 through a twisted pair 216, and receiving a pair of downstream signals from the central office 218 through the twisted pair 216, where the transceiver coil 204 can be first winding of a transformer. The transceiver circuit 206 is behind the transmission unit 202 for coupling the pair of upstream signals to the transceiver coil 204, or coupling the pair of downstream signals from the transceiver coil 204, and it contains second winding of a transformer. In addition, the transceiver circuit 206 and the transceiver coil 204 act as a full-duplex circuit. That is to say, the transceiver circuit 206 and the transceiver coil 204 utilizes a four-to-two method to simultaneously transmit the pair of upstream signals/receive the pair of downstream signals on one twisted pair 216. The hybrid matching circuit 208 includes two hybrid matching circuit units 2082, 2084, where each hybrid matching circuit unit contains a selective impedance unit, and is set by an adjustment signal AS generated by a digital signal processing function of the receiving circuit 210 to adjust a selective impedance of the hybrid matching circuit unit and generate a corresponding matching signal. The receiving circuit 210 is coupled to the hybrid matching circuit 208 and the transceiver circuit 206 for receiving matching signals generated by the hybrid matching circuit 208 and the pair of downstream signals transmitted from the central office 218. The receiving circuit 210 generates the adjustment signal AS according to an upstream rate, a downstream rate, and echo noise coupled to the receiving circuit 210 from the pair of upstream signals transmitted by the transmission unit 202. The receiving circuit 210 utilizes the adjustment signal AS to adjust filter bandwidth of the receiving circuit 210. In addition, the transmission unit 202 is further used for adjusting transmission power and bandwidth of the transmission unit 202 according to the adjustment signal AS.

Figure 3:
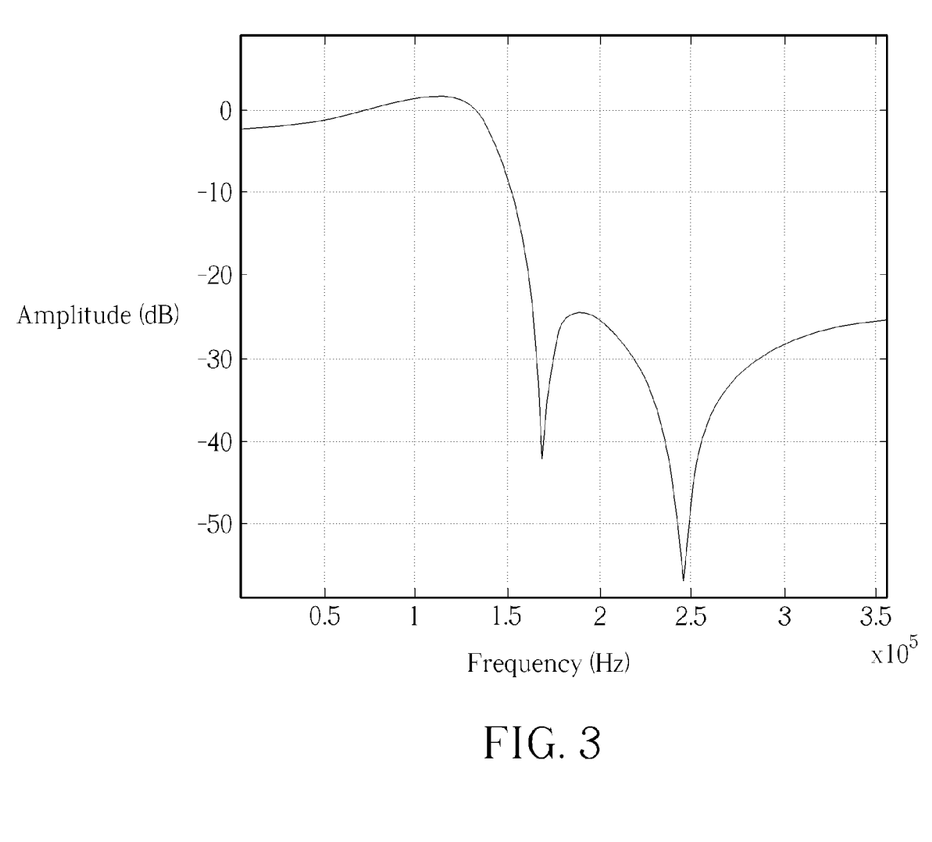
FIG. 3 is a diagram illustrating the amplitude response of the pre-filter.

As shown in FIG. 2, the transmission unit 202 includes a gain amplifier 2022, a transmission filter 2024, and a transmission driver 2026. The gain amplifier 2022 is used for receiving the user transmission signal US, and generating an amplifying signal with the transmission power of the transmission unit 202 accordingly, where the gain amplifier 2022 is used for determining the transmission power spectral density of the transmission unit 202. The transmission filter 2024 is coupled to the gain amplifier 2022 for generating a pair of pre-upstream signals according to the bandwidth and the amplifying signal of the transmission unit 202, where the transmission filter 2024 is integrated with a pre-filter (but, in another embodiment of the present invention, the pre-filter is independent of the transmission filter 2024), and the transmission filter 2024 can determine the bandwidth of upstream signal. The pre-filter can be set to have magnitude response similar to an equalizer according to the adjustment signal AS. That is to say, the magnitude response of the pre-filter can reduce the transmission power of the transmission unit 202 in a lower frequency, and amplify the transmission power of the transmission unit 202 in a higher frequency. Therefore, the pre-filter can utilize the above mentioned characteristics to compensate insertion loss or signal attenuation cause by transmission line of the digital subscriber loop to efficiently increase the upstream rate of the digital subscriber loop. In addition, because the pre-filter is designed to have steeper transition band and lower stop-band response and/or narrower bandwidth of pre-filter, the pre-filter can reduce non-linear distortion and echo noise, which is due to the coupled pair of upstream signals appeared on receiving circuit, to increase a signal-to-noise ratio (SNR) of the receiving circuit 210. Please refer to FIG. 3. FIG. 3 is a diagram illustrating the magnitude response of the fifth order pre-filter. As shown in FIG. 3, transmission power of the pre-filter is decreased 1-2 dB before 70 kHz and the transmission power of the pre-filter is increased 0-2 dB from 70 k to 120 kHz. In addition, the transmission power of the pre-filter is lower than −20 dB in stop-band. Thus, the transmission unit 202 can utilize lower transmission power, and the narrower band of the transmission filter 2024 to achieve the better upstream rate. Lower transmission power could also reduce echo noise leaks to receiving circuit. In addition, the present invention is not limited to the amplitude response of the pre-filter shown in FIG. 3. The transmission driver 2026 is coupled to the transmission filter 2022 for generating the pair of upstream signal according to the pair of pre-upstream signals.

As shown in FIG. 2, the transceiver units 2062, 2064 are coupled to a first output terminal and a second output terminal of the transmission driver 2026. The transceiver unit 2062 includes a coil 20622, a first resistor 20624, a first capacitor 20626, and a receiving path resistor 20628. The transceiver unit 2064 includes a coil 20642, a first resistor 20644, a first capacitor 20646, and a receiving path resistor 20648. The coil 20622 has a first terminal coupled to the first output terminal of the transmission driver 2026, and a second terminal, where the coil 20622 is used for coupling upstream signal to the transceiver coil 204, or coupling downstream signal from the transceiver coil 204 to the receiving circuit 210. The first resistor 20624 has a first terminal coupled to the second terminal of the coil 20622, and a second terminal coupled to the second output terminal of the transmission driver 2026. The first capacitor 20626 has a first terminal coupled to the first terminal of the first resistor 20624, and a second terminal of coil 20622. The receiving path resistor 20628 has a first terminal coupled to the second terminal of the first capacitor 20626, and a second terminal, where the receiving path resistor 20628 and the first capacitor 20626 can form a first order high-pass filter to filter out a low frequency noise of the downstream signal coupled from the upstream signal (that is, the receiving path resistor 20628 and the first capacitor 20626 have an echo suppression function) to generate a first downstream signal. In addition, coupling relationships and operational principles of the coil 20642, the first resistor 20644, the first capacitor 20646, and the receiving path resistor 20648 of the transceiver unit 2064 are the same as those of the coil 20622, the first resistor 20624, the first capacitor 20626, and the receiving path resistor 20628 of the transceiver unit 2062, so further description thereof is omitted for simplicity.

The hybrid matching circuit 208 includes two hybrid matching circuit units 2082, 2084. The hybrid matching circuit units 2082, 2084 are coupled to the first output terminal and the second output terminal of the transmission driver 2026. The hybrid matching circuit unit 2082 includes three resistor/capacitor groups 20822, 20824, 20826, a second capacitor 20828, and a selective impedance 20830. The hybrid matching circuit unit 2084 includes three resistor/capacitor groups 20842, 20844, 20846, a second capacitor 20848, and a selective impedance 20850, where the resistor/capacitor groups 20842, 20844, 20846 are the same as the resistor/capacitor groups 20826, 20824, 20822. The resistor/capacitor groups 20822, 20824, 20826 are coupled between the first output terminal and the second output terminal of the transmission driver 2026. The second capacitor 20828 has a first terminal coupled to the resistor/capacitor groups 20822, 20824, 20826, and a second terminal coupled to the selective impedance 20830. In addition, inner coupling relationships of the hybrid matching circuit unit 2084 are the same as inner coupling relationships of the hybrid matching circuit unit 2082, so further description thereof is omitted for simplicity.

The first resistor 20624 and the first resistor 20644 act as termination resistors, and resistances of the first resistor 20624 and the first resistor 20644 can usually match output impedance of the coils 20622, 20642. Thus, because the first resistor 20624 and the first resistor 20644 act as the termination resistors, and the first resistor 20624, the first resistor 20644, and the coils 20622, 20642 form a Wheatstone bridge-like circuit, the circuit can be used for reducing echo noise coupled to the receiving circuit 210 (that is, components of the pair of the upstream signals coupled to the receiving circuit 210) from the pair of upstream signals. However, for an asymmetric digital subscriber loop, because length and types of the digital subscriber loop are various, the first resistors 20624, 20644 can hardly execute perfect impedance matching, resulting in reduction of echo capability of the first resistors 20624, 20644 being limited.

As shown in FIG. 2, the hybrid matching circuit 208 is used for efficiently decreasing the echo noise in the receiving circuit 210 from the pair of upstream signals, where the hybrid matching circuit units 2082, 2084 are used for simulating the transceiver units 2062, 2064, respectively. The resistor/capacitor groups 20822, 20824, 20826, the second capacitor 20828, and the selective impedance 20830 of the hybrid matching circuit unit 2082, also the circuit 2084, are used for simulating the transceiver unit 2062 and 2064. Hybrid circuit unit 2082 is used to generate a matching signal MS1, where the resistor/capacitor groups 20822, 20824, 20826 act as simulation units for simulating inductive effect of the coil 20622. After the pair of upstream signals are transmitted by the transceiver unit 2062, the pair of upstream signals can be similarly coupled to the receiving circuit 210 through the transceiver unit 2062 to form the echo noise in the receiving circuit 210. The hybrid matching circuit unit 2082 utilizes the resistor/capacitor groups 20822, 20824, 20826, the second capacitor 20828, and the selective impedance 20830 to simulate the transceiver unit 2062 to generate the matching signal MS1. A key of the hybrid matching circuit unit 2082 capable of simulating the transceiver unit 2062 according to various length and types of the digital subscriber loop is that the hybrid matching circuit unit 2082 has a variable impedance (that is, the selective impedance 20830). Because the hybrid matching circuit unit 2082 has the selective impedance 20830 (including a plurality of selective impedances) varied with length and types of the digital subscriber loop, the hybrid matching circuit units 2082, 2084 can generate matching signals MS1, MS2, where the matching signals MS1, MS2 are resemble as the echo noise coupled to the receiving circuit 210 from the pair of upstream signals, but polarity of the matching signals MS1, MS2 and polarity of the echo noise coupled to the receiving circuit 210 from the pair of upstream signals are opposite. As shown in FIG. 2, the downstream signal (including the echo noise coupled to the receiving circuit 210) generated by the transceiver unit 2062 is added by the matching signal MS1 generated by the hybrid matching circuit unit 2082 to generate a second downstream signal. Because the polarity of the matching signal MS1 and the polarity of the echo noise coupled to the receiving circuit 210 from the pair of upstream signals are opposite, the echo noise from the pair of upstream signals can be decreased after downstream signal is added by matching signal MS1 and MS2. As mentioned above, the hybrid matching circuit units 2082, 2084 can select impedance included in the selective impedances 20830, 20850 to well match the transceiver units 2062, 2064 according to various length and types of the digital subscriber loop so that to decrease more echo noise in receiving circuit 210.

As shown in FIG. 2, the receiving circuit 210 includes a receiving filter 2102, an analog-to-digital converter 2104, and an inner receiver 2106. The receiving filter 2102 generates a pair of third downstream signals according to a pair of second downstream signals determined by signals transmitted by the central office 218 and the matching signals MS1, MS2, and filter bandwidth of the receiving filter 2102. The analog-to-digital converter 2104 is coupled to the receiving filter 2102 for converting the pair of third downstream signals into a digital signal. The inner receiver 2106 has a digital signal processing function for generating the adjustment signal AS according to the digital signal and the digital signal processing function, and transmitting the digital signal to another circuit. But, in another embodiment of the present invention, the digital signal processing function is executed by an independent digital signal processing unit.

The inner receiver 2106 generates the adjustment signal AS according to the detected echo noise coupled to the receiving circuit 210 from the pair of upstream signals, and the upstream rate and the downstream rate between the integrated hybrid circuit 200 and the central office 218. That is to say, when the echo noise coupled to the receiving circuit 210 from the pair of upstream signals and the signals transmitted by the central office 218 enter the inner receiver 2106 through the receiving filter 2102 and the analog-to-digital converter 2104, the inner receiver 2106 can utilize the digital signal processing function to determine whether the upstream rate and the downstream rate meets a requirement of a user to generate the adjustment signal AS, where the adjustment signal AS can make the upstream rate and the downstream rate meets the requirement of the user.

Figure 4:
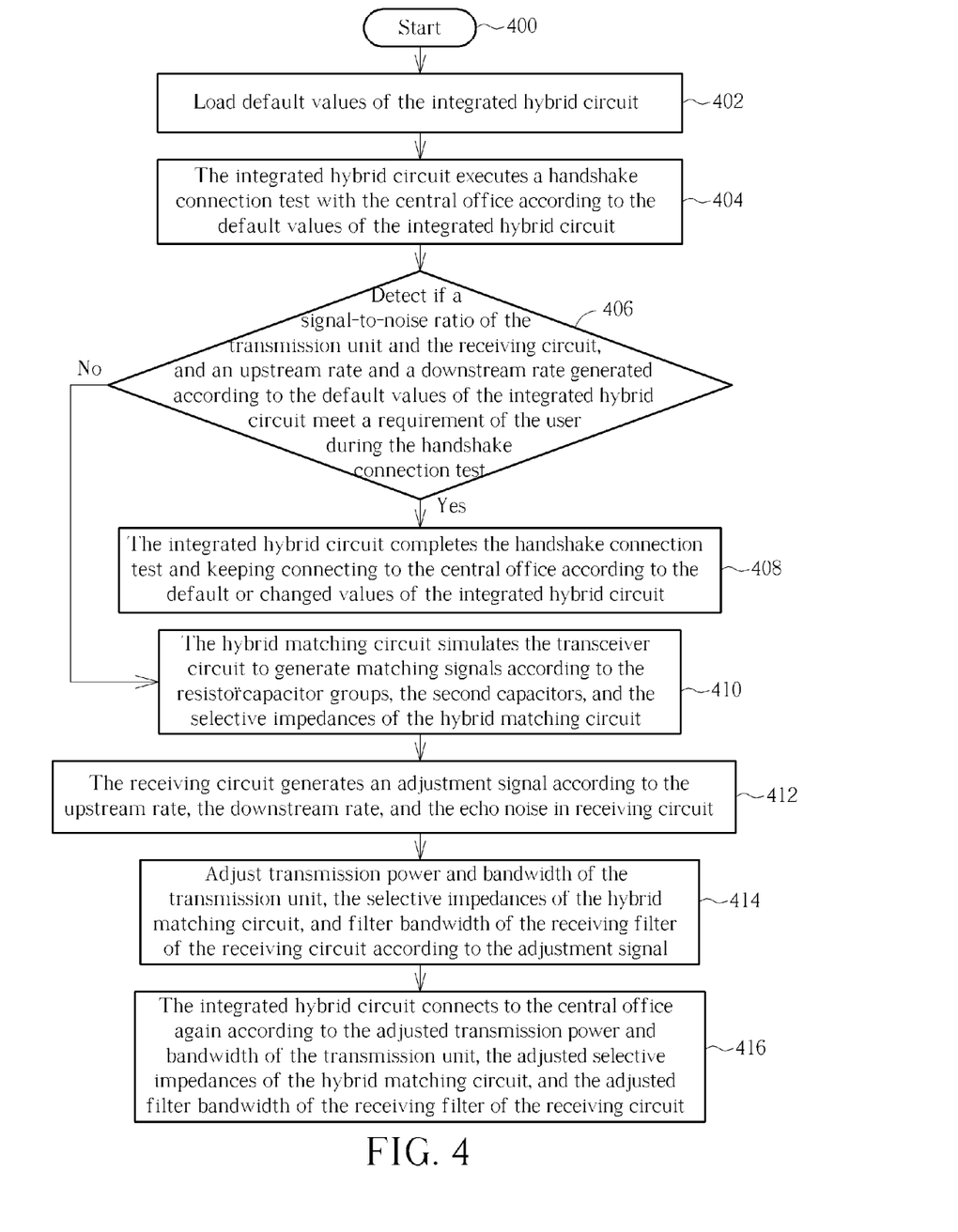
FIG. 4 is a flowchart illustrating a setting method of an integrated hybrid circuit applied to a digital subscriber loop according to another embodiment.

Please refer to FIG. 4 and FIG. 2. FIG. 4 is a flowchart illustrating a setting method of an integrated hybrid circuit applied to a digital subscriber loop according to another embodiment. The operation method in FIG. 4 is illustrated using the integrated hybrid circuit 200 in FIG. 2. Detailed steps are as follows:

Step 400: Start.

Step 402: Load default values of the integrated hybrid circuit 200.

Step 404: The integrated hybrid circuit 200 executes a handshake connection test with the central office 218 according to the default values of the integrated hybrid circuit 200.

Step 406: Detect if a signal-to-noise ratio of the transmission unit 202 and the receiving circuit 210, and an upstream rate and a downstream rate generated according to the default values of the integrated hybrid circuit 200 meet a requirement of the user during the handshake connection test; if yes, go to Step 408; if no, go to Step 410.

Step 408: The integrated hybrid circuit 200 completes the handshake connection test and keeping connecting to the central office 218 according to the default or changed values of the integrated hybrid circuit 200.

Step 410: The hybrid matching circuit 208 simulates the transceiver circuit 206 to generate matching signals MS1, MS2 according to the resistor/capacitor groups 20822, 20824, 20826, the second capacitor 20828, and the selective impedance 20830 of the hybrid matching circuit unit 2082, and the resistor/capacitor groups 20842, 20844, 20846, the second capacitor 20848, and the selective impedance 20850 of the hybrid matching circuit unit 2084.

Step 412: The receiving circuit 210 generates an adjustment signal AS according to the upstream rate, the downstream rate, and the echo noise in receiving circuit.

Step 414: Adjust transmission power and bandwidth of the transmission unit 202, the selective impedances 20830, 20850 of the hybrid matching circuit 208, and filter bandwidth of the receiving filter 2102 of the receiving circuit 210 according to the adjustment signal AS.

Step 416: The integrated hybrid circuit 200 connects to the central office 218 again according to the adjusted transmission power and bandwidth of the transmission unit 202, the adjusted selective impedances 20830, 20850 of the hybrid matching circuit 208, and the adjusted filter bandwidth of the receiving filter 2102 of the receiving circuit 210.

In Step 402, the user first loads the default values of the integrated hybrid circuit 200 corresponding to the central office 218 and the digital subscriber loop, where the default values of the integrated hybrid circuit 200 include the transmission power and bandwidth of the transmission unit 202, impedance values of the selective impedances 20830, 20850 of the hybrid matching circuit 208, and the filter bandwidth of the receiving filter 2102 of the receiving circuit 210. In Step 410, the hybrid matching circuit unit 2082 utilizes the resistor/capacitor groups 20822, 20824, 20826, the second capacitor 20828, and the selective impedance 20830 to simulate the transceiver unit 2062 to generate the matching signal MS1; and the hybrid matching circuit unit 2084 utilizes the resistor/capacitor groups 20842, 20844, 20846, the second capacitor 20848, and the selective impedance 20850 to simulate the transceiver unit 2064 to generate the matching signal MS2. The matching signals MS1, MS2 and the echo noise coupled to the receiving circuit 210 from the pair of upstream signals are resemble, but polarity of the matching signals MS1, MS2 and polarity of the echo noise coupled to the receiving circuit 210 from the pair of upstream signals are opposite. In Step 412, the receiving circuit 210 can generate the adjustment signal AS according to the upstream rate, the downstream rate, and the echo noise, where the matching signals MS1, MS2 are differential pair signals. In Step 414, the integrated hybrid circuit 200 can adjust the transmission power and bandwidth of the transmission unit 202, the selective impedances 20830, 20850 of the hybrid matching circuit 208, and the filter bandwidth of the receiving filter 2102 of the receiving circuit 210 according to the adjustment signal AS. After Step 416 is executed, if the signal-to-noise ratio of the transmission unit 202 and the receiving circuit 210, the upstream rate, and the downstream rate do not still meet the requirement of the user, Steps 406, 410-416 can be executed repeatedly until the signal-to-noise ratio of the transmission unit 202 and the receiving circuit 210, the upstream rate, and the downstream rate meet the requirement of the user.

To sum up, the integrated hybrid circuit applied to the digital subscriber loop transceiver system can efficiently suppress echo noise coupled to the receiving circuit from a pair of upstream signals transmitted by the transmission unit, and the setting method can utilize the hybrid matching circuit with the selective impedances to match the transceiver circuit according to length and types of the digital subscriber loop when the integrated hybrid circuit executes a handshake connection test with the central office. Then, the receiving circuit can generate an adjustment signal according to a signal-to-noise ratio of the receiving circuit, an upstream rate and a downstream rate. Then, the integrated hybrid circuit can adjust the transmission power and bandwidth of the transmission unit, the selective impedances of the hybrid matching circuit, and the filter bandwidth of the receiving filter of the receiving circuit according to the adjustment signal. Therefore, compared to the prior art, the present invention has advantages as follows: first, although the transmission unit has lower transmission power and narrower bandwidth to reduce echo noise coupling to the receiving circuit from the pair of upstream signals, the transmission unit can adjust bandwidth and transmission power of the pre-filter according to the adjustment signal because the transmission unit is integrated with the pre-filter, where because the magnitude response of the pre-filter can reduce the transmission power of the transmission unit in a lower frequency, and amplify the transmission power of the transmission unit in a higher frequency, the present invention can compensate insertion loss caused by signal attenuation when the integrated hybrid circuit transmits the pair of upstream signals, resulting in the upstream rate not being decreased; and second, if the echo noise coupled to the receiving circuit from the transmission unit is not low enough, the integrated hybrid circuit can utilize the adjustment signal to adjust the selective impedances of the hybrid matching circuit according to length and types of the digital subscriber loop, and simultaneously adjust the transmission power and bandwidth of the transmission unit and the filter bandwidth of the receiving filter of the receiving circuit according to an upstream rate/downstream rate requirement to make the signal-to-noise ratio of the receiving circuit optimization. Therefore, the present invention not only can increase the upstream rate, but can also efficiently reduce the echo noise coupled to the receiving circuit from the transmission unit, resulting in the present invention having optimum downstream rate.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An integrated hybrid circuit applied to a digital subscriber loop, the integrated hybrid circuit comprising:
   a transmission unit for generating a pair of upstream signals according to a user transmission signal;
   a transceiver coil for transmitting the pair of upstream signals to a central office through a twisted pair and receiving a pair of downstream signals from the central office through the twisted pair;
   a transceiver circuit coupled to the transmission unit for coupling the pair of upstream signals to the transceiver coil or coupling the pair of downstream signals from the transceiver coil, wherein the transceiver circuit comprises two transceiver units;
   a hybrid matching circuit comprising two hybrid matching circuit units, wherein each hybrid matching circuit unit is used for receiving an adjustment signal to adjust a selective impedance of the hybrid matching circuit unit and generating a matching signal, wherein the hybrid matching circuit unit utilizes the selective impedance and elements further comprised in the hybrid matching circuit unit to simulating a corresponding transceiver unit of the two transceiver units to generate the matching signal; and
   a receiving circuit coupled to the hybrid matching circuit and the transceiver circuit for receiving the pair of downstream signals and two matching signals generated by the hybrid matching circuit, and generating the adjustment signal according to an upstream rate, a downstream rate, and the two matching signals;
   wherein the transmission unit is further used for adjusting transmission power and bandwidth of the transmission unit according to the adjustment signal, and the receiving circuit is further used for adjusting filter bandwidth of the receiving circuit according to the adjustment signal.

2. The integrated hybrid circuit of claim 1, wherein the transmission unit comprises:
   a gain amplifier for receiving the user transmission signal, and generating an amplifying signal with the transmission power accordingly;
   a transmission filter coupled to the gain amplifier for generating a pair of pre-upstream signals according to the bandwidth and the amplifying signal; and
   a transmission driver coupled to the transmission filter for generating the pair of upstream signals according to the pair of pre-upstream signals.

3. The integrated hybrid circuit of claim 2, wherein each transceiver unit of the transceiver circuit is coupled to a first output terminal and a second output terminal of the transmission driver, and the transceiver unit comprises:
   a coil having a first terminal coupled to the first output terminal of the transmission driver, and a second terminal, wherein the coil is used for coupling one upstream signal of the pair of upstream signals to the transceiver coil, or coupling one downstream signal of the pair of downstream signals from the transceiver coil to the receiving circuit;
   a first resistor having a first terminal coupled to the second terminal of the coil, and a second terminal coupled to the second output terminal of the transmission driver;
   a first capacitor having a first terminal coupled to the first terminal of the first resistor, and a second terminal; and
   a receiving path resistor having a first terminal coupled to the second terminal of the first capacitor, and a second terminal, wherein the receiving path resistor and the first capacitor is used for filtering a low frequency noise of the downstream signal to generate a first downstream signal.

4. The integrated hybrid circuit of claim 3, wherein two coils and two first resistors of the transceiver circuit are used for forming a Wheatstone bridge to cancel echo noise of the pair of upstream signals coupled to the receiving circuit.

5. The integrated hybrid circuit of claim 3, wherein the hybrid matching circuit unit is coupled to the first output terminal and the second output terminal of the transmission driver, and the elements of the hybrid matching circuit unit comprise:
   a plurality of resistor/capacitor groups, wherein the plurality of resistor/capacitor groups are coupled between the first output terminal and the second output terminal of the transmission driver; and
   a second capacitor having a first terminal coupled to the plurality of resistor/capacitor groups, and a second terminal coupled to the selective impedance;
   wherein the plurality of resistor/capacitor groups, the second capacitor, and the selective impedance are used for simulating the corresponding transceiver unit to generate the matching signal.

6. The integrated hybrid circuit of claim 1, wherein the receiving circuit comprises:
   a receiving filter for generating a pair of third downstream signals according to a pair of second downstream signals determined by a pair of first downstream signals and two matching signals generated by the transceiver circuit and the filter bandwidth of the receiving circuit;
   an analog-to-digital converter coupled to the receiving filter for converting the pair of third downstream signals into a digital signal; and
   an inner receiver having a digital signal processing function for generating the adjustment signal according to the digital signal and the digital signal processing function.

7. A setting method of an integrated hybrid circuit applied to a digital subscriber loop, wherein the integrated hybrid circuit comprises a transmission unit, a transceiver coil, a transceiver circuit, a hybrid matching circuit, and a receiving circuit, the setting method comprising:
   loading default values of the integrated hybrid circuit, wherein the default values of the integrated hybrid circuit comprises transmission power and bandwidth of the transmission unit, selective impedances of the hybrid matching circuit, and filter bandwidth of the receiving circuit;
   the integrated hybrid circuit executing a handshake test with a central office according to the default values of the integrated hybrid circuit;
   detecting if a signal-to-noise ratio (SNR) of the transmission unit and the receiving circuit, and an upstream rate and a downstream rate generated according to the default values of the integrated hybrid circuit meet a requirement of a user during the handshake test;

when a detection result is that the signal-to-noise ratios of the transmission unit and the receiving circuit, and the upstream rate and the downstream rate generated according to the default values of the integrated hybrid circuit do not meet the requirement of the user, the hybrid matching circuit simulating the transceiver circuit to generate two matching signals according to elements and the selective impedances comprised thereof and the receiving circuit generating an adjustment signal according to the upstream rate, the downstream rate, and the two matching signals; and adjusting the transmission power and the bandwidth of the transmission unit, the selective impedances of the hybrid matching circuit, and the filter bandwidth of the receiving circuit according to the adjustment signal.

8. The setting method of claim 7, wherein loading the default values of the integrated hybrid circuit comprises:

loading the default values of the integrated hybrid circuit corresponding to the central office and the digital subscriber loop according to the central office and the digital subscriber loop.

9. The setting method of claim 7, wherein the signal-to-noise ratio of the receiving circuit is a ratio of a downstream signal received by the receiving circuit to echo noise coupled to the receiving circuit from a pair of upstream signals transmitted by the transmission unit being.

* * * * *